Sept. 9, 1969
J. W. SANDY
3,465,493
PACKAGING MACHINE
Filed Aug. 7, 1967
4 Sheets-Sheet 1
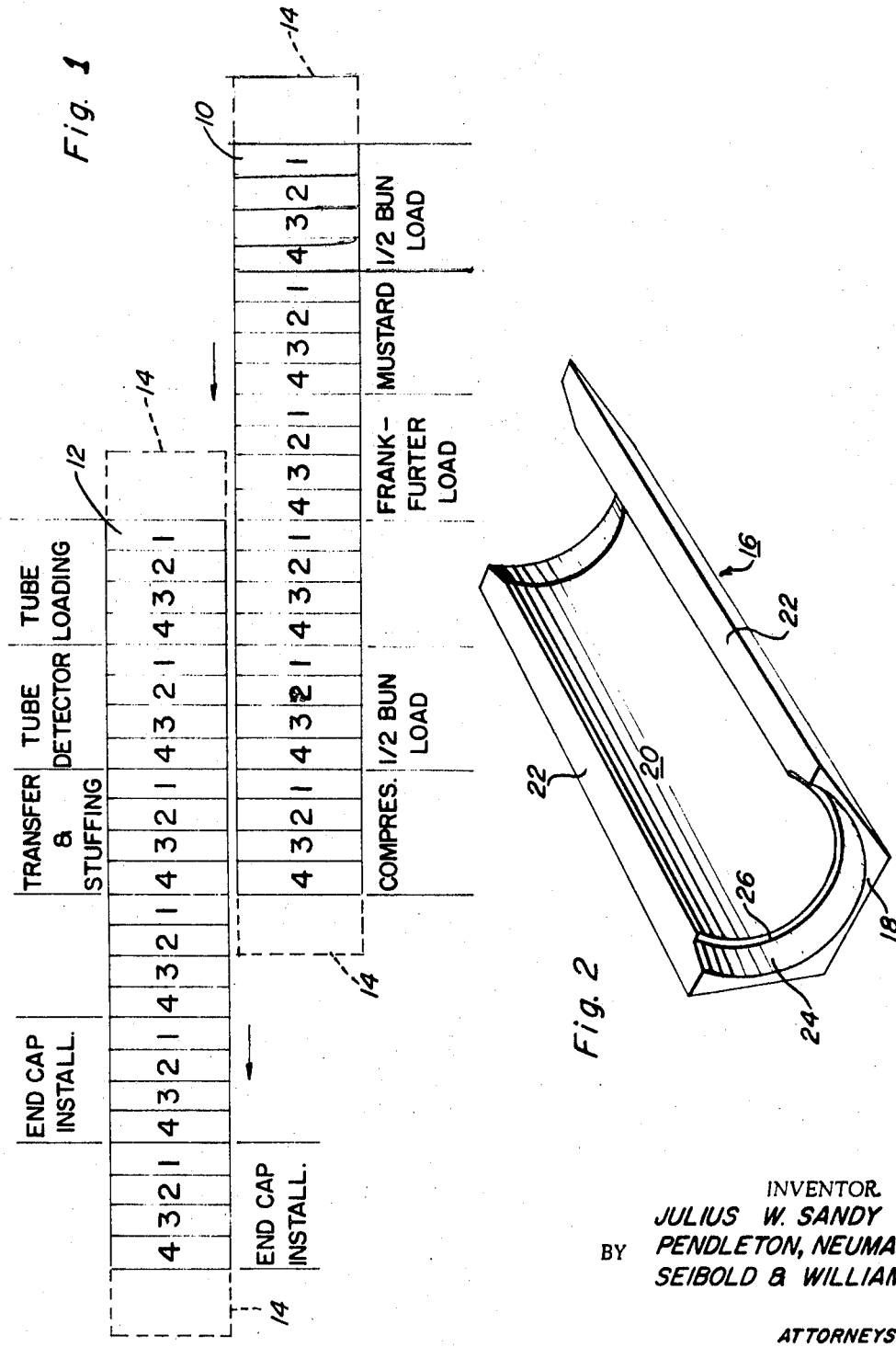
INVENTOR.
JULIUS W. SANDY
BY PENDLETON, NEUMAN
SEIBOLD & WILLIAMS
ATTORNEYS Sept. 9, 1969   J. W. SANDY   3,465,493
PACKAGING MACHINE
Filed Aug. 7, 1967   4 Sheets-Sheet 2
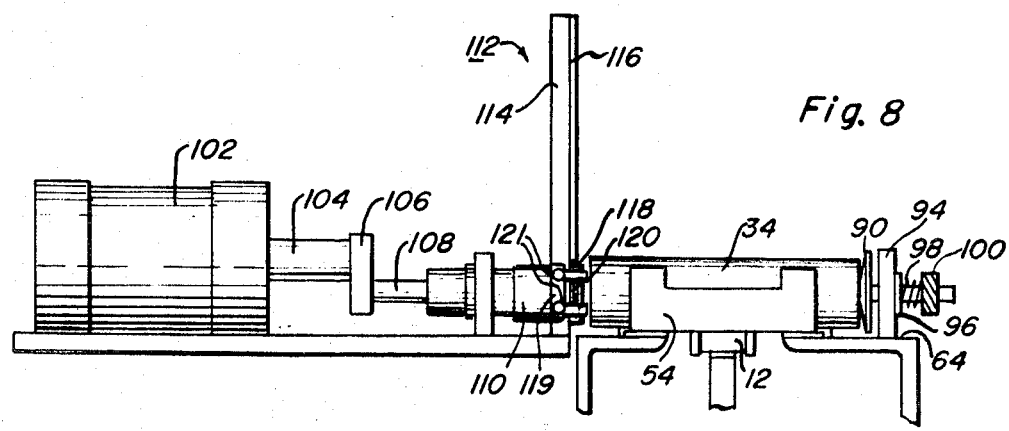
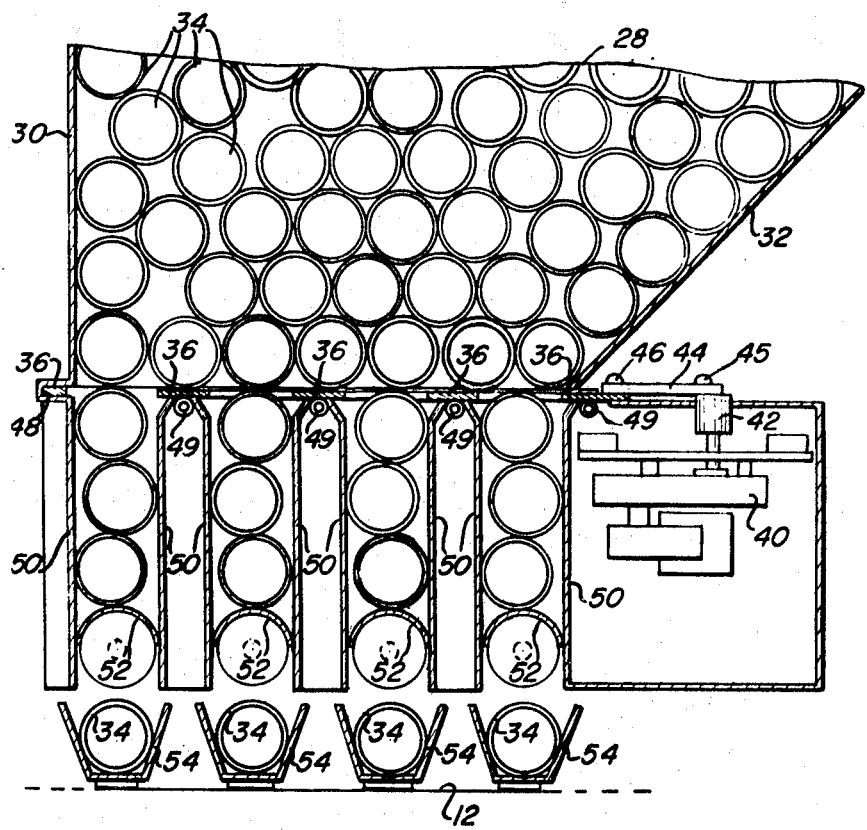
INVENTOR.
JULIUS W. SANDY
BY PENDLETON, NEUMAN
SEIBOLD & WILLIAMS
ATTORNEYS

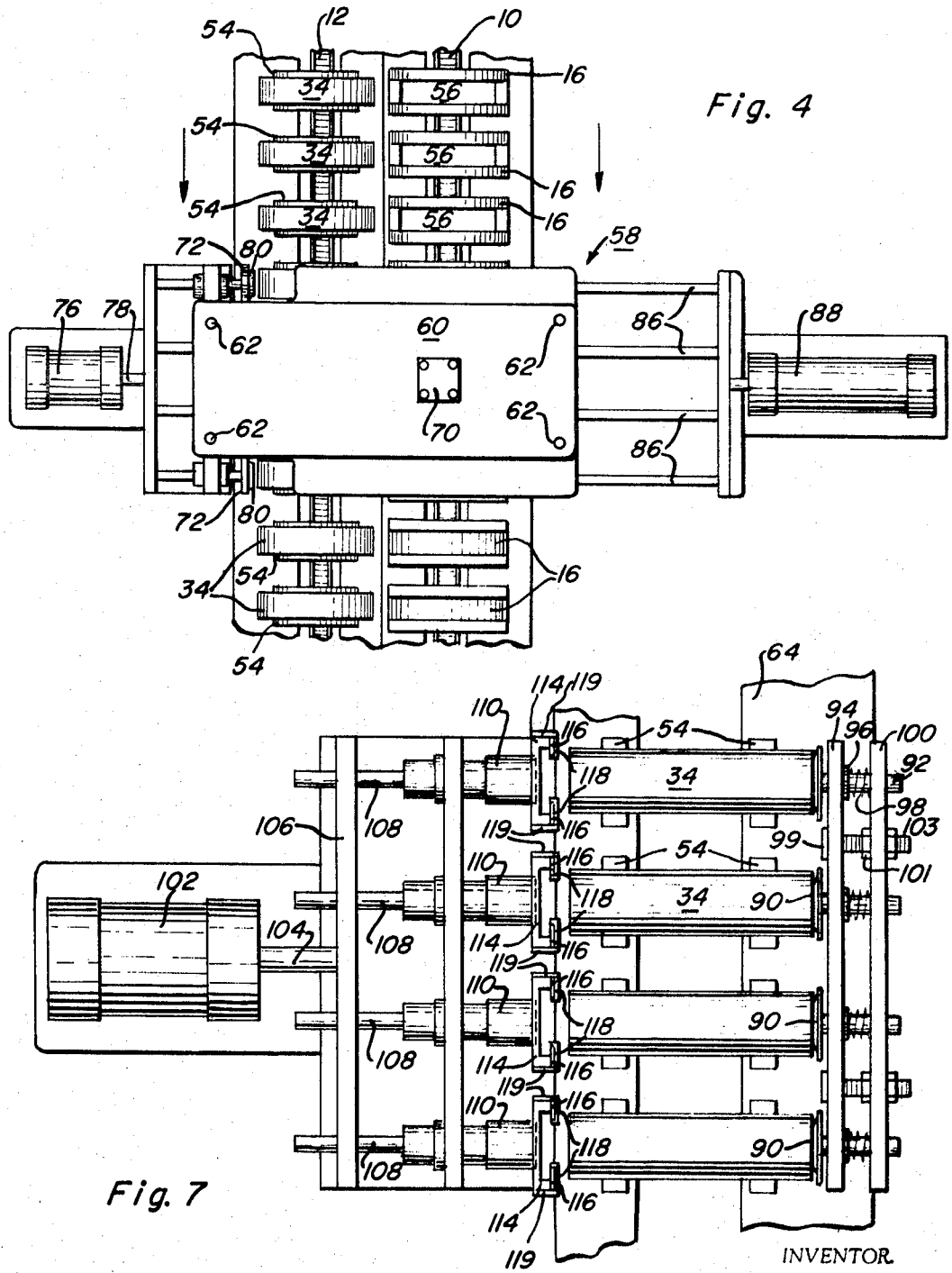

INVENTOR.
JULIUS W. SANDY
BY PENDLETON, NEUMAN
SEIBOLD & WILLIAMS

ATTORNEYS

United States Patent Office
3,465,493
Patented Sept. 9, 1969

3,465,493
PACKAGING MACHINE
Julius W. Sandy, Bensenville, Ill., assignor to Microtherm Limited, London, England, a British company
Filed Aug. 7, 1967, Ser. No. 658,885
Int. Cl. B65b 5/00, 25/22
U.S. Cl. 53—124  10 Claims

ABSTRACT OF THE DISCLOSURE

The present disclosure concerns a packaging machine peculiarly adapted to package sandwiches, each comprising a frankfurter and a bun, in tubular containers. The containers are automatically loaded, four at a time, onto one conveyor belt, and the sandwiches are manually deposited in cup-like receptacles mounted on a second conveyor belt moving in synchronism with the first belt through a plurality of index positions. The two belts are brought into side-by-side relationship at a transfer station, where the sandwiches are compressed transversely between upper and lower cup-like receptacles in a press, and then rammed longitudinally into the containers. The exit end of the receptacles has a funnel-like surface terminating in a shoulder to receive an end of the tubular container and ensure that it is circular. A pair of similar capping stations place end caps in both ends of the containers after they are filled.

---

This application relates to a packaging machine, and more particularly to a machine adapted to package generally cylindrical food objects such as frankfurter sandwiches or the like into hollow tubular containers.

Such containers are preferably employed where the food object within the container is to be heated to an eating temperature within a vending machine apparatus. The tubular containers facilitate handling the food objects within the vending machine, and are also desirable for use where the heating apparatus includes a microwave oven for rapidly heating the food objects. Such an apparatus is illustrated in U.S. Patent No. 3,283,113, issued to Peter H. Smith on Nov. 1, 1966, which patent discloses and claims the combination of a vending machine and a microwave oven for individually heating food objects, enclosed in circular cylindrical tubular containers, to an eating temperature.

As disclosed in the aforementioned Smith patent, it is desirable that the food object, as packaged, be axially symmetric. This can be achieved when the container is in the form of a circular cylinder, and a frankfurter is centrally located within the cylinder and is axially symmetric therewith, the space between the frankfurter and the cylindrical container being fully occupied by a tubular bun or bread roll, which itself is axially symmetric.

Many packaging machines have been designed in the prior art, but those machines have not been well adapted to load the containers involved in the present apparatus in the most efficient manner. Substantially, all of the space in the tubular container is preferably taken up by the food article, so that it is maintained in an axial symmetric position and is not subject to changing its position inside the container.

These objects are most satisfactorily and efficiently met by the apparatus of the present invention. In addition, the present invention lends itself to high speed production of filled containers, because many of its functions are fully automatic.

Other objects and advantages of the present invention will become manifest upon an examination of the following description and the accompanying drawings.

In one embodiment of the present invention, there is provided a pair of endless conveyor belts disposed with an opposite end of each of the belts adjacent each other in parallel relation, a plurality of carriers mounted on both of the belts, means for alligning the carriers of the two belts, the carriers on one of said belts being adapted to support a plurality of axially symmetric sandwiches, the carriers of the other conveyor being adapted to support a plurality of axially symmetric cylindrical tubes, means adjacent the end of the sandwich conveyor for transversely compressing the sandwiches supported by said carriers, means for longitudinally transferring said transversely compressed sandwiches into tubes supported on said tube conveyor, and means for placing end caps in both ends of the loaded tubes.

Reference will now be made to the accompanying drawings in which:

FIG. 1 is a diagrammatic plan view of an embodiment of the present invention illustrating two conveyors in diagrammatic form, together with the relative locations on each of said conveyors where various operations take place;

FIG. 2 is a perspective view of one of the carriers for supporting a sandwich to be loaded into a container, a a plurality of said carriers being disposed in equally spaced relationship on both of the conveyor belts diagrammatically illustrated in FIG. 1;

FIG. 3 is an elevational view, partly in cross section, of a hopper for automatically dispensing four containers at a time onto four carriers of one of the conveyors diagrammatically illustrated in FIG. 1;

FIG. 4 is a plan view of a compressing station, at which four sandwiches are simultaneously transferred from the carriers of one of the conveyors to the tubular containers supported on the other conveyor;

FIG. 7 is a plan view of apparatus associated with the conveyor for supporting the tubular containers, by which end caps are inserted into one end of each of four tubular containers; and FIG. 8 is an elevational view, partly in cross section, of the apparatus illustrated in FIG. 7.

Figure 5:
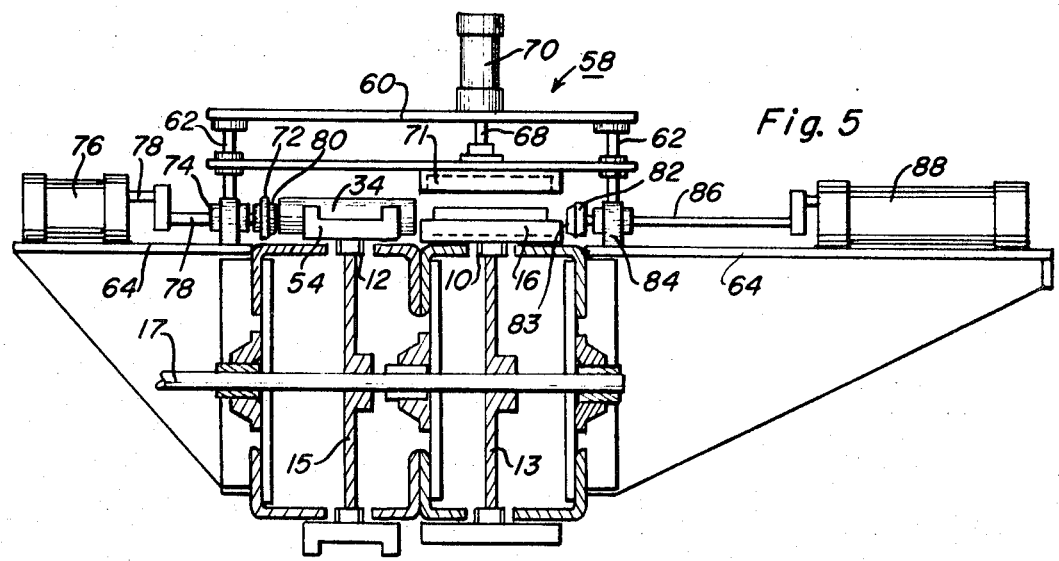
FIG. 5 is an elevational view, partly in cross section, of the apparatus illustrated in FIG. 4.

The machine, as a whole, comprises a pair of endless conveyor belts in side-by-side relation, each supporting a plurality of carriers. The two conveyors incorporated in the present invention are illustrated in diagrammatic plan view in FIG. 1. The carriers of one conveyor 10 support sandwiches or other food articles prior to loading into tubular containers, and the carriers of the other conveyor 12 support the tubular containers. Both conveyors 10 and 12 are preferably endless roller chains (FIGS. 4 and 5), in which the portion illustrated in full lines in FIG. 1 is disposed in a horizontal plane. At both ends 14 of each conveyor; shown in dotted lines in FIG. 1, the belts continue around a sprocket arrangement or the like and return beneath the illustrated portion of the conveyor, with their carriers disposed upside down. The portions of both conveyors 10 and 12 shown in full lines in FIG. 1 move from right to left, as viewed in FIG. 1. Both of the conveyors 10 and 12 are driven in synchronism by means of a pair of sprockets 13 and 15 driven by a common shaft 17 (FIG. 5).

The carriers on each of the conveyors are arranged in groups of four. The members of each group are numbered in the illustration of FIG. 1 from 1 to 4. Each separate group of four carriers 1 to 4 constitutes a single station, and both conveyors 10 and 12 advance or index intermittently from each station to the next, a distance corresponding to the width of four carriers. One such indexing takes place during each machine cycle.

The conveyor belt 10 passes through six stations at which various operations take place. At the first station, one half of a frankfurter bun is placed onto each of the four carriers, such that the hollow of each bun opens upwardly. This is preferably done manually by an operator attending the machine. The four carriers at the first station then advance to the second station in one indexing movement, while four additional carriers replace them at the first station. At the second station, mustard is applied to the hollows of the half-buns supported by the carriers, by an automatic mustard dispenser. The details of the automatic mustard dispenser are not involved in the present invention and will, therefore, not be described. Then the four carriers at the second station advance to the third station of the conveyor 10. At the third station, four frankfurters are loaded by manually placing them into the hollows of the half-buns which were loaded at the first station. At the fourth station, no operations occur.

At the fifth station, four half-buns are loaded onto the carriers of the conveyor 10, on top of the half-buns and frankfurters previously loaded, so that the four carriers at the fifth station support an assembled sandwich including a frankfurter and two half-buns, the two half-buns surrounding the frankfurter in coaxial relation.

At the sixth station, the assembled sandwiches supported by each of the four carriers are transversely compressed by a compression mechanism and thereafter loaded into tubular containers supported by the conveyor 12. The loading is accomplished by means of four pistons, each of which push an assembled sandwich from the compression mechanism into the containers.

The conveyor 12 has six stations, each defined by four successive carriers. The carriers of the conveyor 12 are aligned with corresponding carriers on the conveyor 10. Both of the conveyors 10 and 12 index in unison, so that the alignment between them is continuous. At the first station of the conveyor 12, four circular cylindrical tubes are loaded into the four carriers by means of an automatic hopper. At the second station, a sensing mechanism senses whether all four carriers at this station have been loaded with tubular containers. If one or more of the carriers is empty, the operation of the machine is temporarily halted so that a container may be manually loaded into the empty carrier before operation is resumed.

At the front station of the conveyor 12, the tubular containers receive the transversely compressed sandwiches transferred from the first conveyor.

No operations occur at the fourth station of the conveyor 12.

At the fifth and sixth stations, end caps are installed in opposite ends of the filed containers, after which the filled containers are removed from the conveyor 12.

In FIG. 2, one of the carriers 16 of the conveyor 10 is illustrated. The carrier 16 comprises a solid member having a relatively flat base 18, and a hollowed-out upper portion 20, formed in the shape of a segment of a circular cylinder. The base 18 is securely supported on the conveyor belt 10. The upper surfaces 22 of the carrier 16 are horizontal, and coplanar with the axis of the cylindrical surface 20 so that two of the carriers 16, arranged with their surfaces 22 in contact, form with their interior surfaces a complete circular cylindrical surface. This occurs during compression of the sandwiches and loading of the containers as will be described in more detail hereinafter.

At one end of the carrier 16, a conical recess 24 is provided, coaxial with the surface 20. The smallest diameter portion of the surface 24 is spaced from the surface 20 by a shoulder 26, which shoulder is preferably the same dimension as the thickness of the tubular container, to assist in shaping an end of a container during the time it is being loaded with a sandwich.

Referring now to FIG. 3, there is shown a side elevation view, partly in cross section, of a hopper 28, which is located at the first station of the conveyor 12. The hopper 28 has one vertical end wall 30 and one sloping end wall 32. A plurality of tubular containers 34 are disposed in the hopper 28 in parallel, but otherwise random, orientation. The hopper 28 preferably has side walls disposed in parallel and separated by a distance slightly in excess of the length of the tubular containers 34, to aid in maintaining the containers 34 in parallel relationship.

The bottom of the hopper 28 is formed by a shaker member 36, shown in cross section in FIG. 3. The shaker member 36 is provided with four apertures 38 having a length slightly greater than the length of the tubular containers 34, and having a width slightly greater than the diameter of the containers 34, so that the containers 34 can freely pass through the apertures 38 when they are in proper alignment relative to the apertures. A motor 40 is mounted on the frame of the machine and turns a shaft 42 which has a connecting rod 44 eccentrically connected thereto by a pin 45. The connecting rod 44 is pivotally connected to the shaker member 36 by means of a pin 46 so that the shaker member 36 is reciprocated back and forth under the influence of the motor 40. The remote end of the shaker member 36 is supported for reciprocating movement by a channel 48 formed by a shaped portion of the side wall 30, and by a plurality of rollers 49, supported by the side walls of the hopper.

Below the apertures 38 of the shaker member 36 are disposed four equally spaced parallel channels, each of which contains a column of containers 34. The channels are defined by walls 50, secured to the side walls of the hopper. At the bottom of each of the columns is disposed a hollow semicircular cylindrical shell 52 mounted on the side walls of the hopper for rotation about a horizontal axis. A gear (not shown) is coaxially secured to each of the shells 52, and these gears are interconnected by idler gears (not shown) so that all of the shells 52 rotate together. At an appropriate time during each machine cycle, each of the shells 52 is turned through 360°. When the shells 52 open upwardly, the bottommost container 34 in the column above each shell drops into the shell, and is later dispensed at the bottom of the column when the shell reaches its downwardly opening position (as shown in FIG. 3). The containers 34 are dispensed, four at a time, into a like number of the carriers 54 of the conveyor 12.

The shaker member 36 maintains each of the four columns above the shells 52 filled with containers and eliminates the necessity for prearranging the containers within the hopper 28. The arrangement of the shells 52 provides the simultaneous dispensing of four containers into four corresponding carriers 54 at the first station of the conveyor 12.

After receiving the containers, the conveyor 12 indexes the containers to the second station, at which the carriers 54 are inspected to determine that all of them have been filled with containers. If one or more of the carriers 54 is empty, the operation of the machine is halted in a conventional manner well known to those skilled in the art. The detection means disposed at the second station preferably comprises a series of four switches (not shown) each of which are actuated by a lever moved by a container in position at the second station. All four switches must be closed before a further indexing can take place.

The third station of the conveyor 12 is juxtaposed with the sixth station of the conveyor 10. At this position, the four sandwiches supported by the carriers 16 of the conveyor 10 are compressed and loaded longitudinally into the four carires 54 of the conveyor 12.

In FIG. 4, a plan view of the compressing and loading station is illustrated. The conveyors 10 and 12 both advance in the direction of the arrows, as illustrated in FIG. 4, and each of the carriers 16 illustrated in the upper portion of FIG. 4 supports a sandwich 56. The carriers 54 of the conveyor 12 are aligned with the carriers 16, and each supports an empty tubular container 34. A compressing mechanism 58 is mounted over the top of both of the conveyors 10 and 12, and is shown in side elevation in FIG. 5. The compressing mechanism comprises a top plate 60 mounted by support rods 62 on a horizontal platform 64, which is in turn supported by the frame of the machine. The support rods 62 guide the vertical movement of a plate 66, which is connected by means of a shaft 68 to a power solenoid 70 mounted on the top plate 60. When the solenoid 70 is energized, preferably by pneumatic means, the plate 66 is forced downwardly, being guided by the support rods 62.

On the lower surface of the plate 66 are disposed four cup members 71, which are identical with the carriers 16 illustrated in FIG. 2, and which are aligned directly above four of the carriers 16. The cup members 71 are identical to the carriers 16 as illustrated in FIG. 2. Accordingly, each pair of carriers 16 and cup members 71 form, with their inner, hollow surfaces, a complete circular cylinder, and the sandwich supported by each carrier 16 is compressed between the carrier 16 and the cup member 71, so that the sandwich has a radius equal to the inside radius of the containers 34.

As each cup member 71 and its associated carrier 16 come into engagement with each other to form the cylinder referred to above, the recess 24 of the carrier 16 and the corresponding recess of the cup member 71 form a conical counterbore, one end of which is defined by the annular shoulder 26 of the carrier 16 (FIG. 2), and the corresponding shoulder of the cup member 71. The shoulder of the counterbore has a width equal to the thickness of the containers 34, so that the inner cylindrical surfaces of the combined carrier and cup member is coextensive with the interior of a container 34. Also, the outerdiameter of the shoulder 26 is equal to the outside diameter of the containers 34.

Four containers 34 are urged toward the conveyor 10 by means of four pistons 72, mounted for horizontal sliding relationship relative to a bracket 74. A solenoid 76 is connected to the pistons 72 y a shaft 78, and energization of the solenoid 76 urges the pistons 72 and the containers 34 toward the conveyor belt 10, into engagement with the shoulder 26, to transfer the containers 34 toward and into the conical counterbores in the combined carriers 16 and cup members 71. This movement of the containers 34 does not require any vertical motion, because the carriers 54 are positioned on the conveyor 10 so that the containers 34 are coaxial with the combined carriers 16 and cup members 71, when the compressing mechanism is energized.

The forward portion of each piston 72 is provided with a conical member 80, adapted to fit into the interior of the ends of a container 34. The diameter of the widest portion of the conical member 80 is equal to the inside diameter of the container 34. Accordingly, one end of each container 34 is rigidly positioned adjacent the shoulder 26 of the receptacle 16, and the other end is fixed in position relative to the conical member 80, and both ends of the containers 34 are simultaneously constrained to define perfect circles, through the operation of the conical counterbore 24 and the conical member 80 of the piston 72. Therefore, any slight flattening of the containers 34 is automatically corrected as the containers 34 are positioned for loading with sandwiches.

Figure 6:
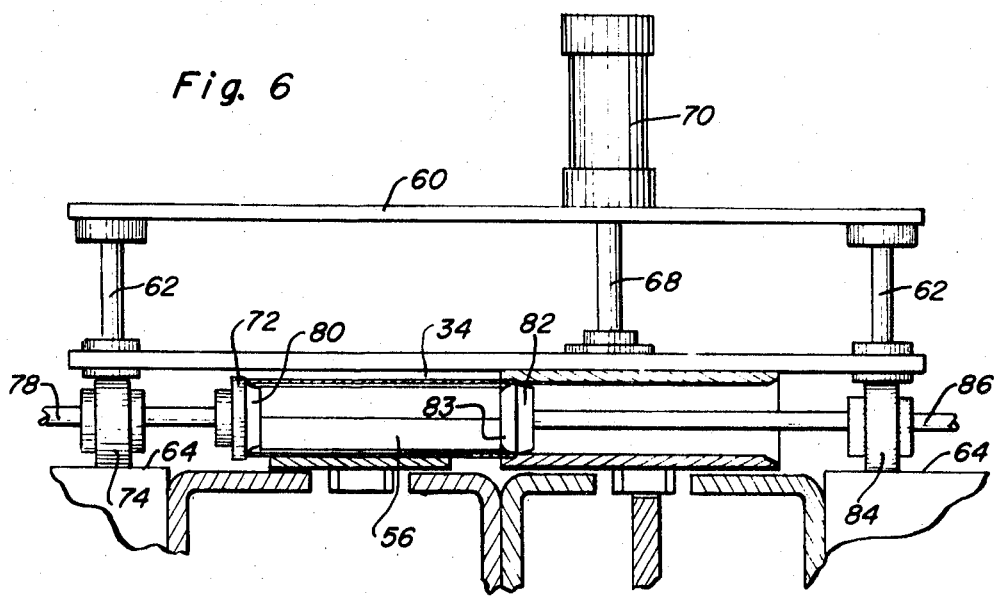
FIG. 6 is an illustration of a part of the apparatus in FIG. 5, shown in greater detail, and illustrating the positioning of a sandwich within a tubular container.

When the four containers 34 are positioned adjacent the shoulders 26, the interior surface of each of the containers 34 is coextensive with the interior hollowed surfaces of the combined carrier 16 and cup member 71. Accordingly, four sandwiches may be easily pushed lengthwise out of the carrier-cup member combinations into the four waiting containers 34. This is accomplished by means of four pistons 82, connected by a plurality of shafts 86 to a solenoid 88, the shafts 86 being supported for longitudinal sliding movement by a bracket 84 secured to the platform 64. Each piston 82 has a resilient pad 83 mounted on its face for engaging the end of the sandwich 56, and for taking up any additional motion of the piston 82 after the sandwich 56 has been fully loaded. In FIG. 6, the apparatus is illustrated after the solenoid 88 has been actuated, and sandwiches have been inserted into their containers 34. The length of the conical member 80, disposed on the forward surface of each piston 72, is such that when the sandwich is completely inserted into the container 34 it comes into contact with the truncated end of the conical member 80, and is then centrally located between the two ends of the container 34. Thereafter, the pistons 72 and 82 are both simultaneously withdrawn before the next indexing of the conveyors 10 and 12, which brings the loaded containers 34 to the fourth station of the conveyor 12, where no operation occurs.

At the fifth station of the conveyor 12, end caps are inserted into one end of each of four containers 34. The end caps preferably of the push-in type and are each formed by shaping a thin sheet of plastic material into a cylindrical portion adapted to fit inside an end of a container 34, and end wall closing the inside end of the cylinder, and an annular flange projecting from the outside end of the cylinder. Such end caps are described and claimed in copending Smith application Ser. No. 518,578, filed Jan. 4, 1966, now abandoned. Four carriers 54, upon which the containers 34 are supported, are stopped in aligned relationship with four convex, dish-shaped members 90. Each of the dish-shaped members 90 is provided with a shaft 92 mounted in sliding relationship within aligned apertures in a bracket 94 and a plate 100. The bracket 94 is mounted on the platform 64, while the plate 100 is mounted on and spaced parallel to the bracket 94 by means of bolts 99 threaded in the bracket 94 and supporting two nuts 101 and 103 clamped on opposite sides of the plate 100. Each shaft 92 has fixed thereto a washer 96, and a spring 98 surrounds the shaft 92 and is compressed between the washer 96 and the bracket 100. Normally, the springs 98 urge the dish-shaped members 90 toward the containers 34 so that the washers 96 angage the bracket 94, but the containers 34 at this station are urged against the dish-shaped members 90, and thereby compress the springs 98. This brings about a relative force between the dish-shaped members 90 and the corresponding ends of the containers 34, and the ends of the containers 34 are automatically aligned, by centering relative to the dish-shaped surfaces.

The end caps are inserted at the opposite ends of the containers 34 from the dish-shaped members 90. A solenoid 102 has its power shaft 104 connected to a bracket 106 rigidly supporting four shafts 108 and four pistons 110 mounted on the shafts 108. The shafts 108 and the pistons 110 are aligned coaxially with their respective containers 34, and a cap holder 112 is disposed between each piston 110 and the corresponding end of its respective container 34. The cap holders 112 each comprise a U-shaped, upstanding channel member 114 in which the end caps are serially disposed in a vertical column. The inside dimensions of the channel member 114 are just sufficient to accommodate the end caps. The open ends of the channel member 114 are partially closed at the upper portion thereof, as illustrated in FIG. 8, by rigid flange members 116 fixed to the edges of the U-shaped member. At the bottom of the cap holders 112, however, a pair of doors or flaps 118 are hinged to the edges of a pair of brackets 119 which are secured to the U-shaped member 114 by screws 121. Two springs 120 hold the doors or flaps 118 in normally closed position, but are adapted to yield to the forward movement of the piston 110 to allow the piston 110 to push one of the caps from the cap holder 112 toward a container 34. The piston 110 carries the cap toward the container until it has inserted the same into the open end of the container 34. If, for any reason, the end cap does not enter the open end of the container 34, due to a defective construction or the like, the opposite end of the container causes its respective spring 98 to yield after a predetermined force has resulted between the piston 110 and the container 34. This force is selectable by adjusting the position of the plate 100, relative to the bracket 94, by adjusting the nuts 101 and 103, and is preferably set below the point where the containers 34 are in danger of being ruptured by the force of the pistons 110. Therefore, any difficulty in inserting the end caps into the containers will result in an open ended container, which may be easily observed and removed from the machine. If a container were allowed to rupture because of the application of excessive capping force, contaminants may enter the interior of the container to contaminate the sandwich. Ruptured containers are difficult to detect, however, because the failure may be very small and practically invisible. One of the advantages of the present invention is derived from the fact that such ruptures may not occur during operation of the machine.

The end cap mechanism disposed at the sixth station of the conveyor 12 is identical in every respect to that which has been described at the fifth station, and so will not be described in detail. The containers at the sixth station already have an end cap applied to one end, and this end cooperates with the dish-shaped members 90 of the capping mechanism at the sixth station. The use of the end caps as described in the aforementioned Smith application Ser. No. 518,578 provides a recess in the capped end of the container 34, so that the dish-shaped members 90 may still function to maintain alignment of the containers 34 during capping at the sixth station.

Following the capping at the sixth station of the conveyor 12, the loading of the containers 34 is complete and they may be boxed in convenient fashion for shipment to the end users.

In the above description, several references have been made to the timing of certain events during each machine cycle. As well known to those skilled in the art, the necessary timing may be achieved by means of a series of cam-operated switches mounted in operative relationship to a series of cams driven by a shaft turning at the rate af one revolution per machine cycle. The time in each cycle at which any event occurs, is determined by the shape of a cam, which in turn determines the time of closing and opening its switch. Several switches may be associated with a single cam, if desired, and a clutch may be provided for the cam drive shaft which is disengaged whenever one of the container-detecting switches, described in connection with the second station of the conveyor 12, remains open, signifying the failure of the mechanism to feed four containers to the carriers 54.

The solenoids which have been described in connection with various parts of the apparatus are preferably air solenoids, powered by a source of compressed air, and controlled by electrically operated valves interposed between the solenoids and the compressed air source and actuated by the cam-operated timing switches.

By the foregoing, the present invention has been described with such particularity as to enable others skilled in the art to make and use the same, and, by applying current knowledge, to adapt the same for use under a variety of conditions.

What is claimed is:

1. In a packaging machine for coaxially packaging an axially symmetric food article into an axially symmetric container, the combination comprising a first conveyor means for rectilinearly conveying a food article-holding carrier, a second conveyor means for rectilinearly conveying a container-holding carrier, said first and second conveyor means being oriented in parallel, side-by-side relation with said container-holding carrier aligned with said food article-holding carrier in a direction transverse to the conveying direction, compressing means associated with said first conveyor means and including said food article-holding carrier for transversely compressing a food article supported by said food article-holding carrier into a circular cylindrical form and maintaining the same in coaxial relation with said container, and ram means co-operating with said compressing means for longitudinally transferring said food article to said container while maintaining said transverse compression and said circular cylindrical form.

2. Apparatus according to claim 1, wherein said food article-holding carrier comprises an upwardly opening shell-like member having an elongate semicircular cylindrical concave surface, an outwardly flared concave surface of revolution formed in one end of said member, said member, said flared surface being coaxial with said cylindrical surface, and an annular shoulder interconnecting one end of said cylindrical surface to the interior end of said flared surface, said shoulder defining a plane transverse to the axis of said cylindrical surface.

3. Apparatus according to claim 2, wherein said compressing means includes a cup member disposed vertically above said food article-holding carrier, said cup member comprising a downward opening shell-like member having an elongate semicircular cylindrical concave surface, an outwardly flared concave surface of revolution formed in one end of said member, said flared surface being coaxial with said cylindrical surface, and an annular shoulder interconnecting one end of said cylindrical surface to the interior end of said flared surface, said shoulder defining a plane transverse to the axis of said cylindrical surface; and means for lowering said cup member into engagement with said food article-holding carrier, bringing the concave surfaces of both into coaxial relationship and the flared surfaces of both into conjunction to complete a funnel-like surface, thereby compressing said food article and forcing said food article into coaxial relation with said concave surfaces.

4. Apparatus according to claim 3, wherein said container comprises a hollow cylindrical tube, the shoulders of said food article-holding carrier and said cup member being equal in radial dimension to the thickness of said tube and having an outer diameter equal to the outer diameter of said tube, and means for inserting an end of said tube through said funnel-like surface into engagement with said shoulder prior to operation of said ram means, whereby said end of said tube is constrained to conform to a circular configuration and the interior surface of said tube is coextensive with said cylindrical surfaces during said transfer of said food article.

5. Apparatus according to claim 1, including a second ram means coaxially disposed in relation to said container opposite said food article-holding carrier, means for advancing said second ram means axially toward said container, said second ram means having a transversely extending flange for engaging an end of said container and a truncated cone with its larger end supported on said flange for entering the end of said container during said transferring of said food article, the diameter of said larger end of said cone being equal to the inside diameter of said container, whereby said end of said container is constrained to conform to a circular configuration during said transfer of said food article.

6. Apparatus according to claim 5, wherein said truncated cone extends inwardly through said end, during said transfer of said food article, a distance equal to the length of the space left remaining at each end of said container when said food article is centrally disposed therein, whereby said food article is centrally positioned by said transfer of said food article, a distance equal to the length of the space left remaining at each end of said container when said food article is centrally disposed therein, whereby said food article is centrally positioned by said transferring ram means with an end of said food article engaging the inner end of said cone.

7. Apparatus according to claim 1, including means for inserting a cap into one end of a container into which a food article has been transferred, comprising means for releasably holding an end cap juxtaposed in coaxial relation with said end of said container, said holding means comprising a vertically disposed channel having an open side opening towards said container, a pair of flaps hinged to said channel at vertical edges of said open side, resilient means urging said flaps to partially close said open side of said channel to normally restrain said end cap, and ram means for intercepting said end cap and pushing it towards said open end of said container, thereby opening said hinged flaps and permitting the release of said end cap from said channel.

8. Apparatus according to claim 7, including a convex dish-shaped member for engaging the end of said container opposite said one end, said dish-shaped member being mounted for sliding relationship relative to a bracket in an axial direction relative to said container, means for resiliently urging said dish-shaped member towards said container, fixed means cooperating with said dish-shaped member for restraining the movement of said dish-shaped member towards said container, said dish-shaped member being displaced by said container, against the force of said resilient means when the force between said container and said dish-shaped member exceeds a predetermined maximum value during the insertion of an end cap into the opposite end of said container, whereby the container is insured against fracture during attempted insertion of an end cap.

9. Apparatus according to claim 1, wherein said first conveyor means includes a plurality of equally spaced food article-holding carriers, said second conveyor means includes a plurality of equally spaced container-holding carriers, said first and second conveyor means being periodically advanced together for a distance corresponding to four of said carriers, said compressing means including four of said food article-holding carriers for simultaneously transversely compressing food articles supported by said four food article-holding carriers into circular cylindrical form, including four ram means for simultaneously longitudinally transferring said food articles into four containers supported by said container-holding carriers, while maintaining said transverse compression and said circular cylindrical form.

10. Apparatus according to claim 9 including a hopper for selectively dispensing a plurality of said containers simultaneously onto said four container-holding carriers, said hopper comprising a bin portion for holding a multiplicity of said containers in parallel-axial arrangement, a plurality of vertical columns extending downwardly from the bottom of said bin portion and communicating therewith, the bottom end of each of said columns terminating just above one of said container-holding carriers, shaker means interposed between said bin portion and said columns having a plurality of apertures each of which is just sufficient in size to pass one of said containers from said bin portion to one of said columns, means for reciprocating said shaker means to feed containers into all of said columns, each of said columns having at the bottom thereof an open shell-like member mounted for rotation about a horizontal axis, each of said shell-like members receiving one of said containers when it opens upwardly and dispensing the container when it opens downwardly, and means for causing the shell-like members in all of said columns to rotate in synchronism to simultaneously dispense a plurality of said containers to said container-holding carriers.

References Cited

UNITED STATES PATENTS

| Re. 16,283 | 3/1926 | Mitchell | 53—35 X |
| 715,340 | 12/1902 | Belot. | |
| 2,027,381 | 1/1936 | Hawker | 53—284 X |
| 2,057,121 | 10/1936 | Trevellyan | 53—35 X |
| 2,501,652 | 3/1950 | Barrickman | 53—37 |
| 3,078,628 | 2/1963 | Ready | 53—24 |
| 3,143,836 | 8/1964 | Weller. | |
| 3,284,981 | 11/1966 | Broersma. | |

WAYNE A. MORSE, JR., Primary Examiner

U.S. Cl. X.R.

53—239, 250, 284